Sept. 28, 1965      G. R. CHURCHILL      3,208,893

METHOD OF MAKING A BUFFING WHEEL

Original Filed Aug. 19, 1960      4 Sheets-Sheet 1

INVENTOR.
George R. Churchill
BY Robert P. Churchill

ATTORNEY

Sept. 28, 1965   G. R. CHURCHILL   3,208,893
METHOD OF MAKING A BUFFING WHEEL
Original Filed Aug. 19, 1960   4 Sheets-Sheet 2
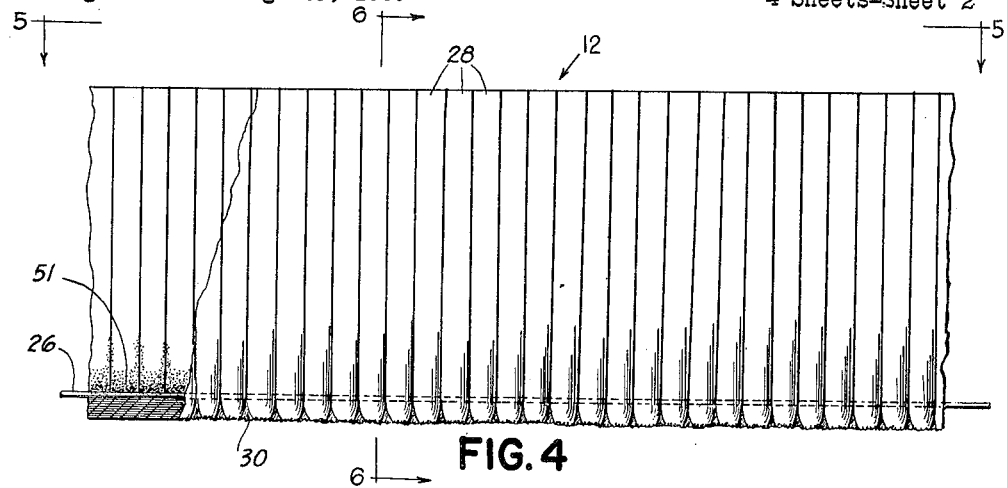
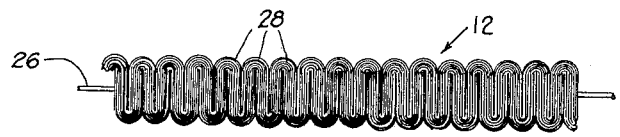
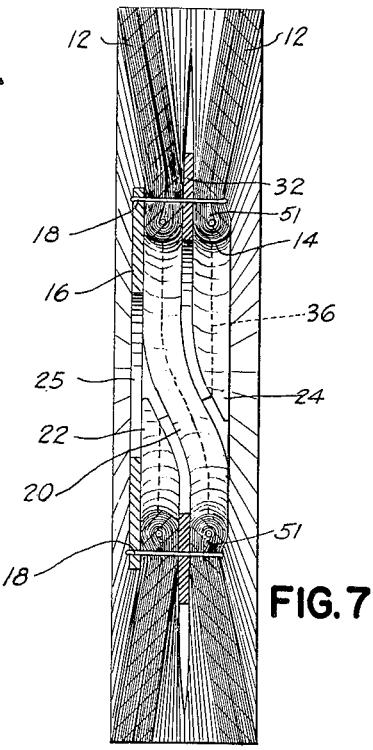
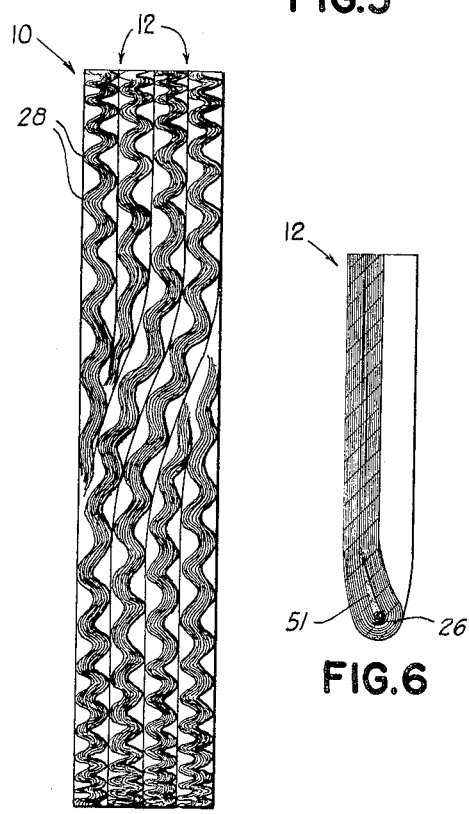
INVENTOR.
George R. Churchill
BY Robert R. Churchill
ATTORNEY Sept. 28, 1965        G. R. CHURCHILL        3,208,893
METHOD OF MAKING A BUFFING WHEEL
Original Filed Aug. 19, 1960        4 Sheets-Sheet 3

INVENTOR.
George R. Churchill
BY
Robert Churchill
ATTORNEY

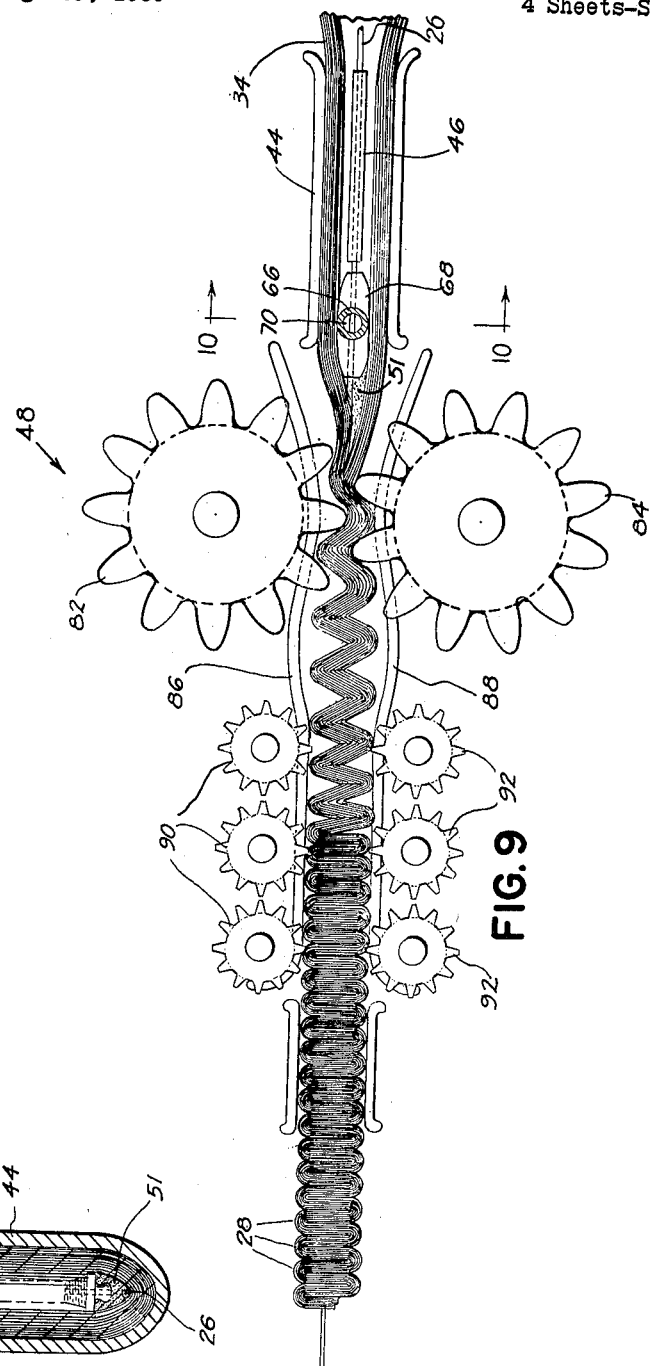

United States Patent Office 3,208,893
Patented Sept. 28, 1965

3,208,893
METHOD OF MAKING A BUFFING WHEEL
George R. Churchill, Cohasset, Mass., assignor to George R. Churchill Company, Inc., Hingham, Mass., a corporation of Massachusetts
Original application Aug. 19, 1960, Ser. No. 50,746, now Patent No. 3,115,730, dated Dec. 31, 1963. Divided and this application Oct. 10, 1961, Ser. No. 144,083
3 Claims. (Cl. 156—176)

This invention relates to a method of making a buffing wheel.

The invention has for an object to provide a novel and improved buffing wheel, and particularly a spirally wound buffing wheel, embodying a novel buffing element which may be economically produced and is highly efficient in use.

A further object of the invention is to provide a novel and improved corrugated buffing element for use in producing a buffing wheel wherein the corrugations are retained in their corrugated condition in a novel and simple manner.

A still further object of the invention is to provide a novel and improved method of making a buffing element comprising a corrugated strip of buffing material which may be produced in a rapid and efficient manner.

With these general objects in view and such others as may hereinafter appear, the invention consists in the buffing wheel embodying a novel buffing element and in the method of making the buffing element as hereinafter described and particularly defined in the claims at the end of this specification.

In the drawings illustrating the preferred embodiment of the invention:

FIG. 3 is a side elevation of the same;

FIG. 4 is a front view of a strip of corrugated multi-ply buffing material used in producing the preent buffing wheel;

FIG. 5 is a plan view of the strip of buffing material shown in FIG. 4;

FIG. 6 is a cross sectional view taken on the line 6—6 of FIG. 4;

FIG. 7 is a cross sectional view of a modified form of buffing wheel section embodying the present invention;

FIG. 9 is a plan view of a portion of the apparatus shown in FIG. 8 and illustrates the steps in the method of producing the present strip of buffing material; and FIG. 10 is a cross sectional view taken on the line 10—10 of FIG. 9.

Figure 1:
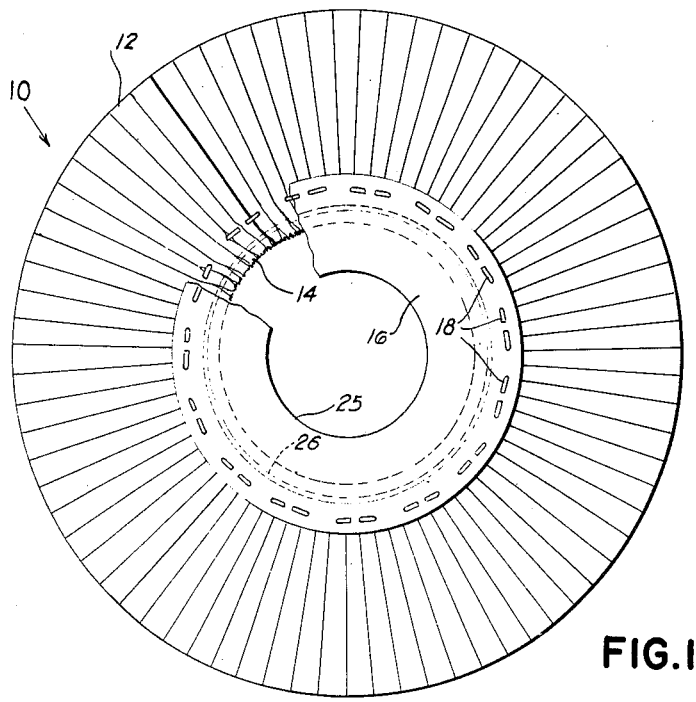
FIG. 1 is a front elevation view, partly broken away, of a buffing wheel section produced in accordance with the present invention.
Figure 2:
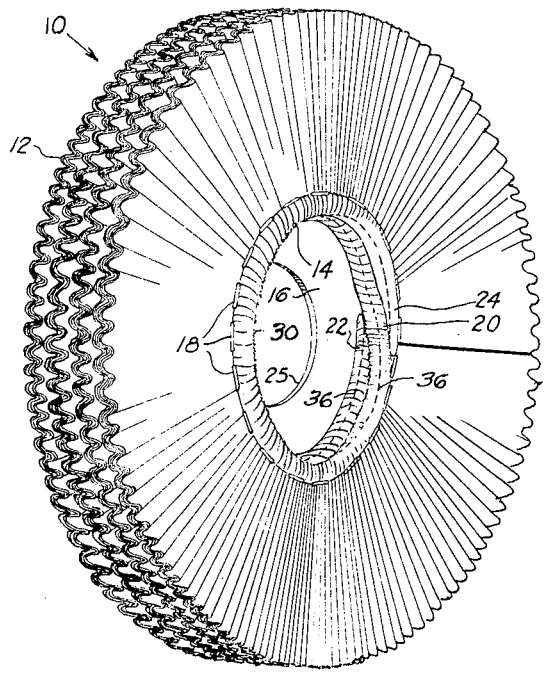
FIG. 2 is a perspective view of the buffing wheel shown in FIG. 1.

In general the present invention contemplates a novel and improved buffing wheel, and more particularly a spirally or helically wound buffing wheel section adapted for use in making an elongated roll type of buffing device. The present buffing wheel section embodies a novel corrugated buffing element which may be economically produced and in which provision is made for retaining the buffing element in its corrugated condition in a simple and novel manner.

The present spiral buffing wheel section is easily and quickly produced by providing a length or strip of the corrugated buffing material and winding it into a double coil or helix to form an annular section wherein the corrugations extend radially from the inside diameter of the annular section. An annular sheet metal or fibrous disk concentric with the helical section is then secured to the section by stapling the same thereto. The annular disk provides a center plate having an opening therein which conforms to the size of the arbor on which it is mounted, and in practice a plurality of such individual sections are mounted face to face on the arbor and clamped thereon to provide an elongated buffing wheel or roll.

While the present buffing wheel is described as having an annular disk stapled thereto, other forms of center plates or rings may be used if desired.

The illustrated buffing element comprises an elongated strip of buffing material provided with transversely extended, substantially uniform corrugations closely compacted together. In practice an elongated web of multi-ply cloth or other known surface treating material may be folded upon itself along a longtudinal center line to provide a strip, U-shaped in cross section. An elongated wire is preferably extended within the fold for guiding and controlling the strip during the corrugating operation and to form a part of the completed buffing element. In accordance with the present invention a quick setting thermoplastic hot metal adhesive is deposited along the fold line of the inner ply immediately prior to performing the corrugating operation, and as the corrugations are being formed the adhesive is spread around the wire and upwardly between the legs of the inner ply for a short distance. Thereafter, during the compacting and compression of the corrugations the hot melt adhesive sets up to retain the corrugations in their compressed condition. The corrugated buffing element thus produced may be coiled or otherwise stored for future use in producing buffing wheel sections.

Referring now to the drawings, 10 represents a buffing wheel section embodying the present invention and which comprises a helically wound corrugated buffing element 12 having two helical coils or convolutions providing an annular section having a central opening 14 and radially extended corrugations. The ends of the helically wound element are initially unconnected to their adjacent convolutions, and the annular section thus formed is provided with an annular disk or center plate 16 of sheet metal or stiff fibrous material concentrically arranged and secured to the annular helically wound section by a circular row of staples 18. The legs of the staples extend through the coils of buffing material adjacent the inner marginal edge of the annular section and through the outer marginal edge of the center plate 16 to be clinched over the outer face of the plate. As herein shown, the double coil provides an offset or angularly arranged portion indicated at 20 at the area where opposed ends of the helically wound strip occur, and in practice the ends of the strip may and preferably will be beveled or tapered on their inner faces as indicated at 22, 24 to compensate for the increased thickness at this area whereby to produce a buffing wheel section of substantially uniform width. A buffing wheel section thus produced provides a relatively wide buffing area or working surface of substantially uniform density, and the helical winding of the buffing material presents a working surface wherein the coils are arranged at a slight angle from the perpendicular so as to provide a so-called "cross-cut" or "streak-free" working surface. The disk 16 is provided with a central opening 25 for mounting the double helix buffing wheel section on an arbor together with similar sections to produce a relatively wide buffing wheel or roll.

FIG. 7 illustrates a modified form of the present buffing wheel section which may include a fibrous spacer 32 inserted between the coils or convolutions of the helically wound section which serves to space the coils and provide a wider buffing area. It will be observed that the spacer 32, which separates the two coils of the helically wound buffing element is formed by a single helically shaped coil, and in practice an annular and relatively rigid fibrous member may be conveniently cut radially through one marginal edge to produce the single coil spacer. The spacer thus cut may be placed between the coils with one end thereof disposed under the starting end of one coil and with the other end thereof disposed under the terminating end of the second coil to assume a single coil helical formation as shown. The inside diameter of the spacer corresponds substantially to the inside diameter of the buffing wheel section, and the outside diameter of the spacer is of a size such as to permit the same to be secured to the coils and to the center plate 16 by the staples 18 which pass through the spacer as shown.

A strip or length of the present corrugated buffing material 12 is illustrated in FIG. 4 and comprises a multi-ply web of cloth or other surface treating material such for example as a fabric impregnated with grit or an abrasive material folded medially upon itself along a longitudinal center line to form a U-shaped strip. A wire 26 is extended along the inner fold line, and the buffing material is provided with transverse corrugations 28 which are compressed and compacted longitudinally as shown in FIG. 5. The corrugations extend transversely of the strip from a point immediately above the wire 26 to the free edges of the strip, the material immediately adjacent the wire being closely gathered or puckered together to form a crimped marginal edge as indicated at 30. In accordance with the present invention the opposed legs of the inner ply of the multi-ply folded strip are adhesively secured together to prevent expansion of the corrugated structure and to retain the corrugations in their compacted condition. The corrugated strip of buffing material thus prepared may be cut to a predetermined length and formed into a double helix to produce a buffing wheel section as above described. While it may be preferred to form a double helix a buffing wheel section having a single turn may be produced.

Figure 8:
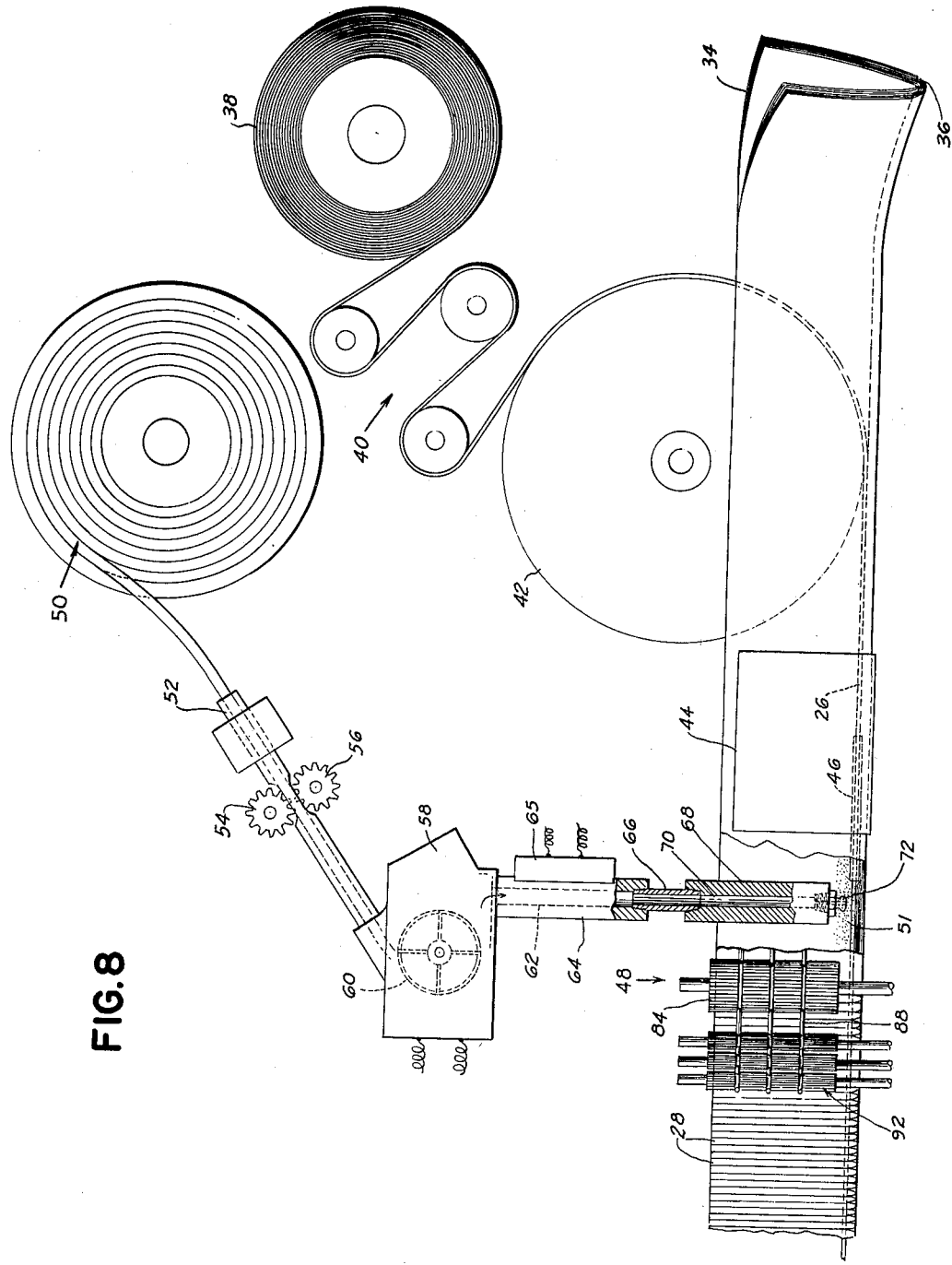
FIG. 8 is a side elevation of apparatus for producing the present strip of buffing material in accordance with the present invention.

Referring now to FIGS. 8 and 9 illustrating the method of producing the buffing element shown in FIG. 4, a multi-ply web of cloth 34, preferably secured together by a longitudinally extended row of stitching 36 disposed medially of the marginal edges of the web, is folded transversely upon itself providing a multi-ply cloth strip U-shaped in cross section. The wire 26, which extends within the folded edge, is withdrawn from a supply roll 38 and passed through a wire straightening device indicated generally at 40 and around a guide wheel 42 which extends between the sides of the folded strip to align the wire with the folded edge as shown. The U-shaped strip may be continuously advanced between the upstanding legs of a supporting guide 44, and the wire is arranged to pass through a small diameter stationary guide tube 46 to hold the wire down in the fold during the corrugating operation. As hereinshown, the tube 46 terminates a short distance in front of the corrugating mechanism indicated generally at 48, and in operation the folded edge passes under the guide tube which holds the folded edge against the bottom of its supporting guide 44.

In accordance with the present invention provision is made for depositing a continuous and substantially uniform supply or stream of adhesive along the bottom of the inner fold during the continuous advance of the U-shaped strip at a point immediately preceding the passage of the strip into the corrugating mechanism 48. The adhesive employed comprises a thermoplastic hot melt adhesive provided in a continuous cord-like form and supplied in a coil as indicated at 50 in FIG. 8. In operation the cord-like adhesive is passed through a guide tube 52 and between opposed star-shaped driven feed wheels 54, 56 arranged to advance the cord-like adhesive at a uniform rate into a heated melt receptacle indicated generally at 58 and which is provided with a driven internal melt wheel 60. The melted adhesive flows through a passageway 62 formed in an outlet member 64 which is provided with a heating unit 65 arranged to maintain the adhesive in its melted condition during its flow to the point of applicaton. The lower end of the member 64 is connected by a pipe nipple 66 to the upper end of an adhesive dispensing member 68 which extends vertically between the legs of the inner ply of the U-shaped strip. The nipple 66 communicates with a passageway 70 in the dispensing member 68, and the lower end thereof is provided with a dispensing nozzle 72 which terminates immediately above the inner fold and the wire disposed therein. As illustrated in FIG. 9, the vertically extended dispensing member 68 is substantially rectangular in cross section and assumes a flattened shape to fit between the legs of the U-shaped strip, and the front and rear longitudinal edges of the member 68 are beveled, as shown, to facilitate passage of the strip therepast.

In operation the thermoplastic cord-like adhesive 50 is fed into the melt receptacle 58 at a controlled rate, and the melted adhesive indicated at 51 flows through the dispensing nozzle 72 at a controlled degree of flow to deposit a uniform application of adhesive along the bottom of the fold of the inner ply and on top of the wire 26. The amount of adhesive discharged from the dispensing nozzle 72 is such that when the U-shaped strip is subsequently passed into the corrugating mechanism 48 the liquid adhesive will be squeezed around the wire and upwardly a short distance between the legs of the inner ply and between the inner transverse folds of the corrugations.

The corrugating mechanism 48 may and preferably will comprise apparatus similar to that illustrated and described in my copending application, Serial No. 790,560, filed February 2, 1959, now Patent No. 3,080,689. As herein shown, the continuously advancing strip, after receiving the application of adhesive, passes between opposed upright driven corrugating gears 82, 84 which cooperate to shape the multi-ply material as it passes therebetween to provide uniform transverse open corrugations therein from a point spaced a short distance above the wire 26 to the marginal edges of the strip. Successive open corrugations or reverse folds are formed by the tooth of one gear cooperating with the hollow or space between the teeth of the opposing gear forming successive transverse corrugations in the buffing material. The strip is guided at this time between spaced guide rods 86, 88 which extend between grooves formed in the gears to strip the material away from the teeth as it passes beyond the corrugating gears and to in addition prevent the corrugated strip from being laterally deflected. It will be understood that the folded edge of the material is free to slide along the wire 26 and to be compressed longitudinally during the corrugating operation. It will be seen that during the corrugating operation the adhesive will be squeezed between the legs of the inner ply of the U-shaped strip and between the puckered or crimped portions around the wire 26.

The strip of buffing material is then guided between a series of opposed upright retarding gears 90, 92 which are arranged to be driven at a slower rate of speed than the corrugating gears and operate to hold the material back so that the open corrugations are gradually compressed together and compacted into closely spaced relation as shown in FIG. 9. During the initial portion of the compacting operation the adhesive is further squeezed between the legs of the inner ply and between the folds of the corrugations, and at the end of the compacting operation the quick-setting adhesive has hardened or set up to such an extent that the corrugations are firmly set in a compacted corrugated condition. In practice it has been found that the quick-setting adhesive does not penetrate outwardly through or beyond the first or inner ply of the strip, presumably because of the relatively short time between the application of the adhesive, the corrugating, compacting operations, and setting of the adhesive. Also the nature of the hot melt adhesive and the texture of the cloth buffing material is such that penetration does not occur. Consequently, the outer surface of the cloth and the surfaces of the gears through which the cloth passes do not become covered with adhesive. However, it was found that the adhesive spread between the legs and the folds of the corrugations and between the puckered or crimped portions adjacent the wire 26 of the inner ply only, as indicated at 51 in FIG. 4, served to firmly bond the inner ply in a manner such that the remaining interlocked intermediate and outer plies of the multi-ply strip are also firmly held in their corrugated condition which factor enables the corrugated strip to be easily stored and the corrugations retained.

Prior to the present invention it was necessary to stitch, staple, clamp or otherwise mechanically secure the corrugations in their compacted condition after the corrugated strip left the retarding gears. Hence the present method, which includes applying the adhesive along the inner fold prior to the corrugating operation and then permitting the adhesive to set up during the compacting operation, is of particular advantage since it permits the corrugated strip to retain its compacted corrugated condition without the use of additional retaining means.

In operation the present double helix buffing wheel sections provide a relatively thick working face of uniform density mounted on a single center plate. This substantially reduces the cost per unit. In practice the number of plies of cloth or other buffing material in the multi-ply web 34 may be varied when producing the corrugated U-shaped strip whereby to provide a wider or narrower working face in the completed double helix buffing wheel sections, and the width may be further increased by inserting a spacer 32 between the coils of the helix to produce a softer buffing action. The present helically wound sections also provide a cross cut buffing action as well as a straight action which tends to prevent ridging of the work. Another advantage in the use of a plurality of individual buffing wheel sections of substantial width arranged face to face to make up an elongated buffing roll resides in the ability to remove and replace intermediate sections of the roll which become worn down more quickly than adjacent sections, and such removed sections may be retrimmed for further use in the roll or for other uses.

While the description of the present buffing wheel section is herein directed particularly to a double helix section produced by a length of corrugated buffing material adhesively retained in its corrugated condition and wound to provide two coils or convolutions, it will be apparent that a single ring buffing wheel section may be produced with a length of the present corrugated buffing material. In addition it will be apparent that more than a double helix section may be produced in accordance with the present invention. For example, but not by way of limitation, three or more coils may be used to produce the buffing wheel section. Also while the web of buffing material is herein defined as preferably comprising cloth buffing material it will be understood that other buffing or surface treating materials such for example as so-called "grit cloth" may be employed in producing the corrugated strip of buffing material.

Perhaps one of the most important advantages of the present method resides in the fact that the corrugated material may be taken directly from the corrugating apparatus and stored for future use, the corrugations being retained permanently by the adhesive. This, of course, substantially increases production speed and results in substantial savings in labor and material.

This application is a division of my copending application, Serial No. 50,746, filed August 19, 1960, now Patent No. 3,115,730.

Having thus described the invention, what is claimed is:

1. The method of making a corrugated strip of surface treating material for making a helically wound buffing element comprising the steps of folding an elongated multi-ply strip of surface treating material longitudinally into a U-shape in cross section, moving said U-shaped strip lengthwise; applying a quick-setting adhesive along the bottom of the fold only of the inner ply during said movement; corrugating the leg portions of said U-shaped strip while in motion; longitudinally contracting the corrugated portion of the strip, said quick-setting adhesive becoming hardened adjacent the lower ends of the corrugations during the contracting operation to retain the corrugations in their contracted condition after the corrugating operation; edge winding the corrugated strip to provide a helically wound strip; and securing the helically wound strip to a hub member to retain the strip in its final wound shape.

2. The method of making a buffing wheel element for making a helically wound buffing element comprising the steps of: longitudinally advancing an elongated U-shaped multi-ply strip of buffing material; positioning a wire within and at the bottom of the U of the strip to be advanced therewith; guiding the strip along a stationary tube disposed within the U of the strip and through which the wire is advanced; applying a hot melt quick-setting adhesive along the bottom of the inner ply only of the U during the continuous advance of the strip; thereafter corrugating the leg portions of the strip to provide uniform corrugations therein, said adhesive being spread upwardly a short distance between the legs of the U and the inner ply corrugations during the corrugating operation; retarding the linear speed of a portion of the corrugated strip to effect longitudinal contraction of the folds and to form puckers in the material adjacent the bottom of the U, said adhesive entering between the folds and the puckers of the inner ply of the U during the initial portion of the contracting operation; said quick-setting adhesive hardened during the latter stages of the contracting operation whereby to retain the corrugations in their contracted condition; edge winding the corrugated strip to provide a helically wound strip; and securing the helically wound strip to a hub member to retain the strip in its final wound shape.

3. The method of making a strip of surface treating material for making a helically wound buffing element comprising the steps of folding an elongated strip of surface treating material longitudinally upon itself, compacting the folded strip longitudinally to form a series of transverse puckered folds therein immediately above the longitudinal fold after applying a quick-setting adhesive along the bottom of the inner ply of the longitudinal fold of the strip whereby to retain the strip in its compacted condition upon hardening of the quick-setting adhesive; edge winding the corrugated strip to provide a helically wound strip; and securing the helically wound strip to a hub member to retain the strip in its final wound shape.

References Cited by the Examiner

UNITED STATES PATENTS

| | | | |
|---|---|---|---|
| 1,622,116 | 3/27 | Jaspert | 156—191 |
| 2,141,235 | 12/38 | Angeletti | 156—204 XR |
| 2,732,001 | 1/56 | Halstead | 156—438 |
| 2,801,671 | 8/57 | Vaughn et al. | 156—204 |
| 3,111,442 | 11/63 | Voisin | 156—192 |

FOREIGN PATENTS 187,005   4/06   Germany.

EARL M. BERGERT, *Primary Examiner.*